Nov. 8, 1960 R. E. LINDSTROM 2,959,441
UTILITY HANDLE FOR A CONTAINER
Filed June 3, 1959
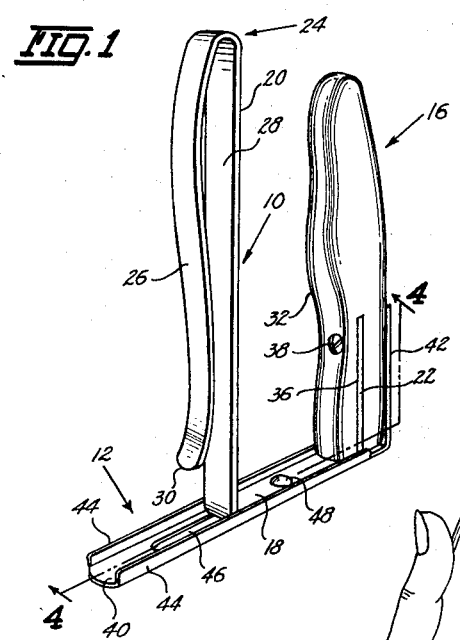
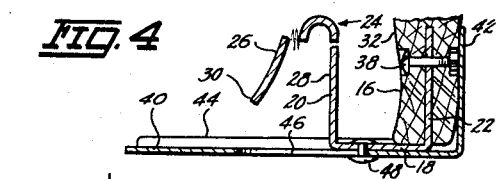
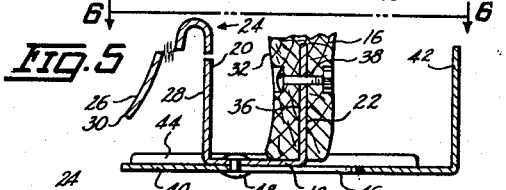
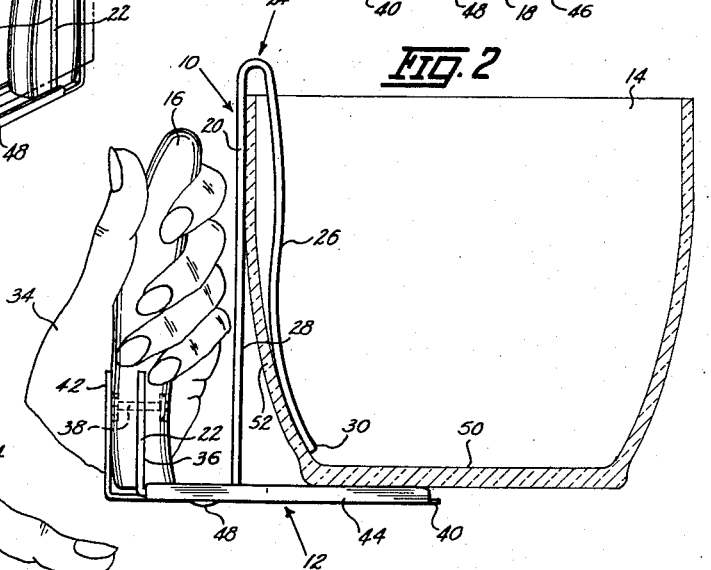
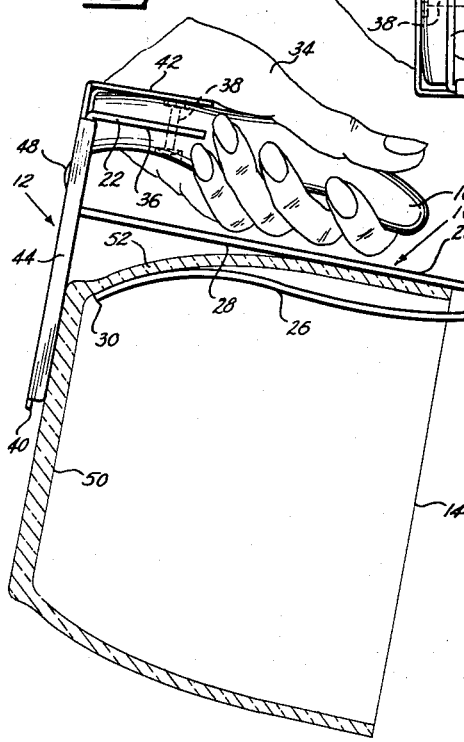
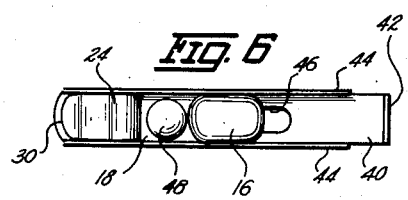
INVENTOR.
ROBERT E. LINDSTROM
BY Morton S. Adler
ATTORNEY.

United States Patent Office 2,959,441
Patented Nov. 8, 1960

2,959,441

UTILITY HANDLE FOR A CONTAINER

Robert E. Lindstrom, 1433 Mitchell Ave., Waterloo, Iowa

Filed June 3, 1959, Ser. No. 817,914

7 Claims. (Cl. 294—29)

This invention relates to handles for a container and more particularly one of the important objects contemplated herein is the provision of a novel utility handle designed for easy attachment to and removal from containers such as mixing bowls and the like that are not normally equipped with handles.

Another object is to provide a handle of the above class that can be employed to lift a relatively heavily loaded bowl in a vertical plane and to tilt the same for emptying the contents thereof without placing any undue strain on any portion of the bowl.

A further object is to provide a handle as characterized that is economical to manufacture, durable in construction and extremely efficient for its intended use.

Other objects and advantages of this invention reside in the details of construction and correlation of the various parts and will be apparent as the description proceeds.

This invention consists of novel parts and combination of parts to be hereinafter described whereby the objects set forth are attained, as pointed out in the claims, and illustrated in the accompanying drawings, in which:

Fig. 1 is a perspective view illustrating a preferred embodiment of this invention, Fig. 2 is a section view of an upright bowl showing my handle applied thereto preparatory to lifting the bowl, Fig. 3 is similar to Fig. 2 but showing the bowl being tilted by means of my new handle, Fig. 4 is a fragmentary sectional view taken on the line 4—4 of Fig. 1, Fig. 5 is similar to Fig. 4 but showing the lower slide member in retracted position, and Fig. 6 is a top plan view taken from the line 6—6 of Fig. 5.

Referring to the drawings my handle assembly shown in Fig. 1 includes three unit parts, namely a combined bowl supporting clip and handle or handle support 10, a movable slide means 12 for providing support to the bottom of a bowl 14 (Fig. 2) and a gripping handle 16.

Unit 10 which is preferably made from a suitable sturdy bar material includes a bottom strip 18 having the upstanding integral members 20 and 22 on respective opposite ends. Member 22 defines what I shall call the rear portion of this device and is approximately half or less as high as point 24 on member 20 with such member representing the forward end thereof. Member 20 is bent back upon itself at point 24 to form the elongated S-shaped resilient clip or hook 26 extending in part in closely spaced relationship to the forward face 28 of such member and downwardly to a point where the lower clip end 30 is slightly spaced above the plane of strip 18. Member 22 which may serve independently as a hand gripping means is preferably used to support the enlarged handle member 16 of any suitable material which may be provided with a scalloped edge 32 to facilitate its gripping by the hand 34 of a user. Handle 16 is preferably generally elongated in shape having a slot 36 formed in the lower end portion to receive member 22 which is secured thereto in any suitable manner such as by the transverse rivet or pin 38 or the like.

Slide unit 12 is generally L-shaped having an elongated bottom 40 and an upstanding arm or stop 42 on one end thereof. Bottom 40 is formed with upstanding flanges 44 along both longitudinal edges so as to be channel shaped in cross section (Fig. 1) and is also provided with a longitudinal slot 46 intermediate its ends. Unit 12 is slidably arranged relative to unit 10 and for this purpose strip 18 of unit 10 is placed upon bottom 40 of unit 12 which is slidable longitudinally thereof with flanges 44 serving as guide tracks as shown in Fig. 1. Members 18 and 40 are movably secured together by means of a pin or rivet 48 extending through slot 46 as illustrated in Figs. 4 and 5. Pin 48 is secured tight enough to prevent free movement of members 18 and 40 but is yielding enough to permit unit 12 to be manually movable relative to unit 10. Handle 16 is formed in width to extend between flanges 44 and to have an abutting engagement therewith so that slide 12 is tracked against the lower end of the handle and steadied and stabilized in its travel relative to unit 10.

In the forward and operable position of slide 12, arm 42 will be in abutting engagement with the rear side of handle 16 and the forward end of the slide will project forwardly of and below tip 30 of clip 26 as seen in Fig. 1. The rearward or non operable position of slide 12 is shown in Fig. 5.

To use this device, the slide unit 12 is moved to its rearward position and the end 30 of clip 26 is slipped over the rim of a bowl 14 and down the side thereof to a point closely adjacent the inside of the bowl bottom 50 as seen in Fig. 2. Slide 12 is then moved to its forward position where its forward projecting portion will be disposed under and abutting the outer side of the bowl bottom to support the same. In this position slide arm 42 is abutting the rear of handle 16 and the user in grasping handle 16 (Figs. 2–3) will of necessity include arm 42 within his grasp so as to tightly hold it against handle 16 and prevent the forwardly bowl supporting portion of slide 12 from moving from its position under bowl bottom 50. Unit 10 is made of sufficient height that the curved portion at point 24 will extend above the rim of bowl 14 so as to cause no strain thereon. At the same time clip 26 by its S shape will bear against a portion of the inside of the bowl side 52 generally in the lower half thereof so that as the bowl is tilted (Fig. 3) the weight of the bowl is carried by clip 26 engaging side 52 and in this tilted position, clip end 30 will abut against the inside of bowl bottom 50 so that the rim of the bowl is kept out of contact with the curved portion of member 20 at point 24. At all times, of course, slide 12 provides a steadying effect at the bottom of the bowl and will carry the major amount of the weight when the bowl is held in upright position. To remove this utility handle, the procedure described for applying it is merely reversed.

It is submitted that the invention shown and described is aptly suited to achieve the purposes intended and is characterized by a combination of highly useful and mutually cooperating elements that combine their respective and proportionate functions in accomplishing the objects sought to be obtained.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:

1. A detachable handle unit for an open top container, comprising, a vertically disposed elongated inverted U-shaped resilient clip member, a vertically disposed handle in parallel spaced relationship to said clip member and integrally connected at its bottom end to the bottom of one end of said clip member by a transverse strip, a slide, means mounting said slide to said strip for longitudinal movement relative thereto, said clip member adapted to be slipped over the rim of a container so that the respective lengths of said clip member are oppositely disposed on respective opposite sides of a side of the container, a portion of said clip adapted to bear against the inner side of the container side, said clip member being longer than the height of the container so as to be free from engagement with the rim of the container, said slide movable to and from a position under and abutting the bottom of the container, and means on said slide to hold it in abutting contact with the bottom of the container.

2. A handle for removable attachment to an open top container, comprising a vertically disposed elongated inverted U-shaped resilient clip, a vertically disposed handle in parallel spaced relationship to said clip, a horizontal strip member connecting the bottom of said handle and the bottom of one end of said clip and integral therewith, an elongated slide member, means mounting said slide member to said strip member for longitudinal slidable movement relative thereto so as to project beyond the vertical plane of said clip in a direction away from said handle, and means on said slide member to hold it in its projecting position.

3. A handle for removable attachment to an open top container, comprising a vertically disposed elongated inverted U-shaped resilient clip, a vertically disposed handle in parallel spaced relationship to said clip, a horizontal strip member connecting the bottom of said handle and the bottom of one end of said clip and integral therewith, an elongated slide member, means mounting said slide member to said strip member for longitudinal slidable movement relative thereto so as to project beyond the vertical plane of said clip in a direction away from said handle, and a vertically disposed arm integral on one end of said slide member adapted to abut against said handle to limit the movement of said slide member in its projecting position.

4. In a removable handle assembly for an open top container, a pair of vertically disposed members in parallel spaced relationship integrally connected at their bottom ends by a transverse strip, one of said members defining a hand gripping means and the other defining an elongated vertically disposed inverted U-shaped resilient clip having a free end disposed above the plane of said transverse strip, an elongated slide channel-shaped in cross section nested to the underside of said transverse strip, means attaching said transverse strip to said slide and affording longitudinal movement of said slide relative thereto in two respective opposite directions, and means on said slide to hold it in its projecting position.

5. In a removable handle assembly for an open top container, a pair of vertically disposed members in parallel spaced relationship integrally connected at their bottom ends by a transverse strip, one of said members defining a hand gripping means and the other defining a resilient hook member having a portion thereof adapted to extend over the rim of an open top container and to bear against the inner side wall thereof at a point substantially within the container, said hook member being longer than the height of the container so as to be free of engagement with the rim of the container, a slide member, means slidably mounting said slide member to said transverse strip for axial movement relative thereto so as to be projectible beyond the vertical plane of said hook member in a direction that will place it below and abutting the bottom of the container on which said hook member is engaged, and means on said slide member to hold it in abutting contact with the bottom of the container.

6. In a removable handle assembly for an open top container, an elongated resilient hook member having a first and second end respectively, the first end of said hook member mountable over the rim of a container so as to embrace a portion of the container wall over the major distance of its height, a handle member, a first means connecting said handle member to the second end of said hook member, a slide member, a second means slidably connecting said slide member to said first means so that said slide member is projectible angularly relative to said hook member in a direction that will place said slide member below and abutting the bottom of the container on which said hook member is mounted, and means on said slide member to hold it in its projected position.

7. A handle for removable attachment to an open top container, comprising a vertically disposed elongated inverted U-shaped resilient clip, a vertically disposed handle in parallel spaced relationship to said clip, a first means connecting said handle to one end of said clip, a slide member angularly disposed relative to said clip and handle, a second means slidably connecting said slide member to said first means, and means on said slide member to limit the movement thereof relative to said clip and handle.

References Cited in the file of this patent

UNITED STATES PATENTS

| | | |
|---|---|---|
| 1,457,657 | Fahsbender | June 5, 1923 |
| 2,010,317 | Olson | Aug. 6, 1935 |
| 2,630,244 | Brock | Mar. 3, 1953 |
| 2,733,947 | Platt | Feb. 7, 1956 |
| 2,777,725 | Weir | Jan. 15, 1957 |